(12) United States Patent  (10) Patent No.: US 9,148,290 B2
Salam et al.  (45) Date of Patent: Sep. 29, 2015

(54) FLOW-BASED LOAD-BALANCING OF LAYER 2 MULTICAST OVER MULTI-PROTOCOL LABEL SWITCHING LABEL SWITCHED MULTICAST

(71) Applicant: Cisco Technology, Inc., San Jose, CA (US)

(72) Inventors: Samer Salam, Vancouver (CA); Ali Sajassi, San Ramon, CA (US); Ayan Banerjee, Fremont, CA (US); Sami Boutros, San Ramon, CA (US)

(73) Assignee: Cisco Technology, Inc., San Jose, CA (US)

( * ) Notice: Subject to any disclaimer, the term of this patent is extended or adjusted under 35 U.S.C. 154(b) by 167 days.

(21) Appl. No.: 13/930,680

(22) Filed: Jun. 28, 2013

(65) Prior Publication Data

US 2015/0003450 A1  Jan. 1, 2015

(51) Int. Cl.
*H04L 12/28* (2006.01)
*H04L 12/18* (2006.01)

(52) U.S. Cl.
CPC ................................. *H04L 12/1836* (2013.01)

(58) Field of Classification Search
None
See application file for complete search history.

(56) References Cited

U.S. PATENT DOCUMENTS

| | | | |
|---|---|---|---|
| 7,675,860 B2 | 3/2010 | Vasseur et al. | |
| 7,684,350 B2 | 3/2010 | Raj et al. | |
| 7,899,049 B2 | 3/2011 | Raj et al. | |
| 8,004,960 B2 | 8/2011 | Raj | |
| 8,064,440 B2 | 11/2011 | Bhaskar | |
| 8,077,713 B2 | 12/2011 | Vasseur et al. | |
| 8,089,964 B2 | 1/2012 | Lo et al. | |
| 8,233,479 B2 | 7/2012 | Wijnands et al. | |
| 8,339,996 B2 | 12/2012 | Wijnands et al. | |
| 8,391,185 B2 | 3/2013 | Wijnands et al. | |
| 8,488,616 B2 | 7/2013 | Wijnands et al. | |
| 2007/0174483 A1 | 7/2007 | Raj et al. | |
| 2009/0201937 A1* | 8/2009 | Bragg et al. | 370/401 |
| 2012/0163373 A1 | 6/2012 | Lo et al. | |
| 2013/0077629 A1 | 3/2013 | Wijnands et al. | |
| 2013/0177018 A1 | 7/2013 | Wijnands et al. | |

(Continued)

OTHER PUBLICATIONS

Sajassi, et al., "BGP MPLS Based Ethernet VPN", Network Working Group, Internet Draft, draft-ietf-12vpn-evpn-03, Feb. 2013, 47 pages, The Internet Engineering Task Force Trust.

(Continued)

*Primary Examiner* — Afshawn Towfighi
(74) *Attorney, Agent, or Firm* — Parker Ibrahim & Berg LLC; James M. Behmke; Stephen D. LeBarron

(57) ABSTRACT

In one embodiment, a particular PE device of a plurality of multi-homing PE devices between a core network and a local network determines a subset of traffic for which the particular PE device is responsible. The particular PE also establishes, with itself as root, a multicast tree within the local network for underlay multicast groups. Traffic received at the particular PE from the core network is admitted into the local network only if the core traffic corresponds to the subset of traffic for which the particular PE device is responsible (and mapped into one of the underlay multicast groups for which the particular PE device is the root). Also, multicast traffic received at the particular PE from the local network is forwarded into the core network only if the multicast traffic corresponds to the subset of traffic for which the particular PE device is responsible.

22 Claims, 11 Drawing Sheets

(56) References Cited

U.S. PATENT DOCUMENTS

2013/0329728 A1* 12/2013 Ramesh ..................... 370/390
2014/0126422 A1* 5/2014 Bragg ........................ 370/255

OTHER PUBLICATIONS

Sajassi, et al., "PBB-EVPN", Internet Working Group, Internet Draft, draft-ietf-12vpn-pbb-evpn-04, Feb. 2013, 20 pages, The Internet Engineering Task Force Trust.

* cited by examiner

US 9,148,290 B2

FLOW-BASED LOAD-BALANCING OF LAYER 2 MULTICAST OVER MULTI-PROTOCOL LABEL SWITCHING LABEL SWITCHED MULTICAST

TECHNICAL FIELD

The present disclosure relates generally to computer networks, and, more particularly, to multicast data transmission over computer networks.

BACKGROUND

Large storage environments comprising Data Centers that are physically and/or logically separated from one another are rapidly replacing stand-alone storage environments. In such large storage environments, data must frequently travel over different networks using different communication protocols in order to reach their destinations. There is a strong interest among Service Providers (SP) in providing Cloud services, and ideally, SPs are interested in offering Cloud services using their existing IP infrastructure. Unfortunately, current Data Center interconnect solutions have significant limitations. It is therefore desirable to provide improved Data Center interconnect mechanisms for multicast transmissions.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
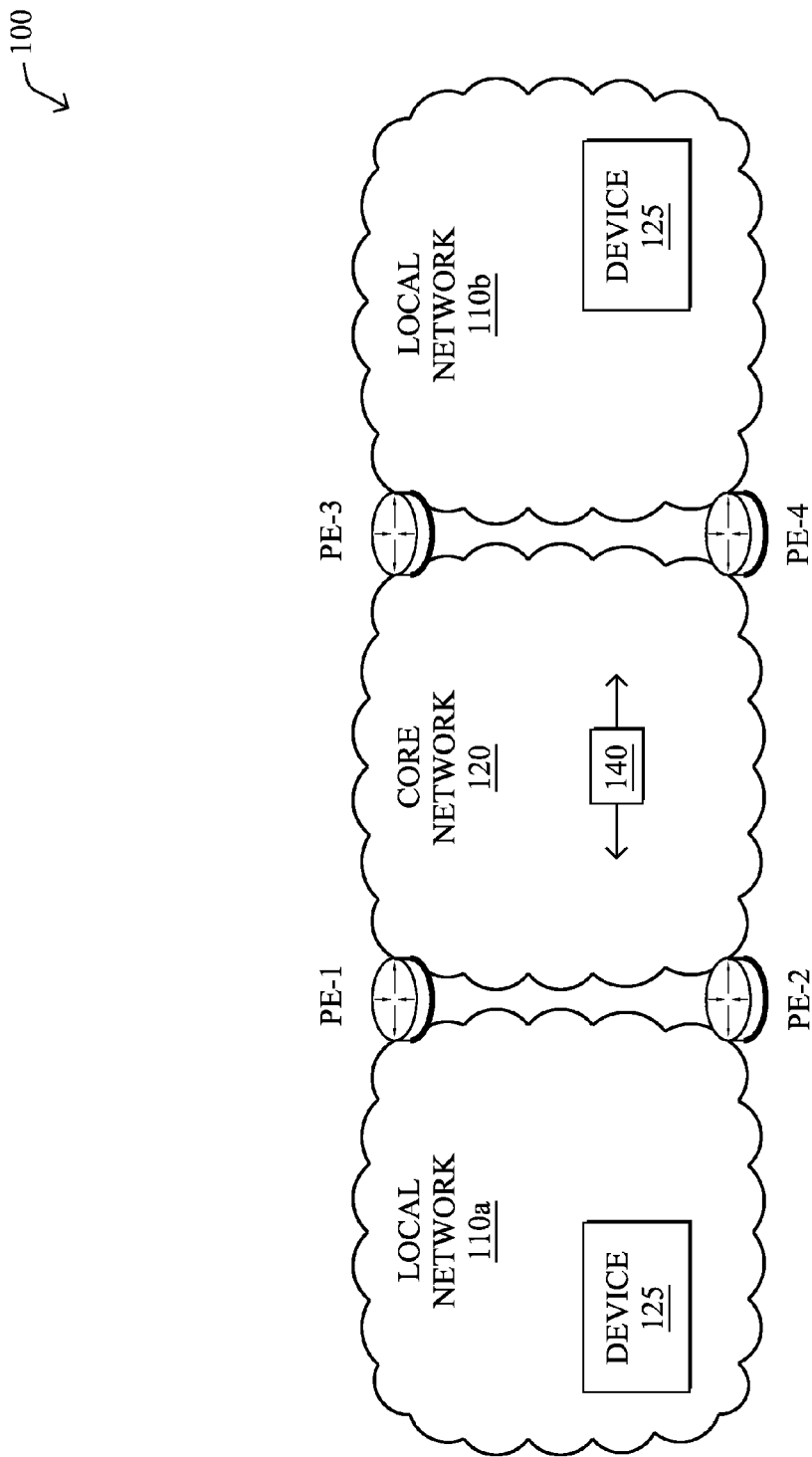
FIG. 1 illustrates an example computer network.

According to one or more embodiments of the disclosure, a particular provider edge (PE) device of a plurality of multi-homing PE devices between a core network and a local network determines a subset of traffic for which the particular PE device is responsible. The particular PE also establishes, with itself as root, a multicast tree within the local network for one or more underlay multicast groups. Traffic received at the particular PE from the core network (e.g., from a label switched multicast (LSM) tree) is admitted into the local network only if the core (e.g., LSM tree) traffic corresponds to the subset of traffic for which the particular PE device is responsible, where the admitted traffic is mapped by the particular PE device into one of the one or more underlay multicast groups for which the particular PE device is the root. Also, multicast traffic received at the particular PE from the local network is forwarded into the core network only if the multicast traffic corresponds to the subset of traffic for which the particular PE device is responsible.

Description

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas" or "levels." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS, area, or level is generally referred to as a "domain."

FIG. 1 is a schematic block diagram of an example computer network 100 illustratively comprising nodes/devices, such as a plurality of routers/devices interconnected by links or networks, as shown. For example, provider edge (PE) devices (e.g., PE1, PE2, PE3, and PE4) may allow for communication between devices 125 within two or more local networks 110*a,b* via a core network 120. Those skilled in the art will understand that any number of nodes, devices, links, etc. may be used in the computer network, and that the view shown herein is for simplicity. Those skilled in the art will also understand that while the embodiments described herein is described generally, it may apply to any network configuration within an Autonomous System (AS) or area, or throughout multiple ASes or areas, etc.

Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, etc.

Figure 2:
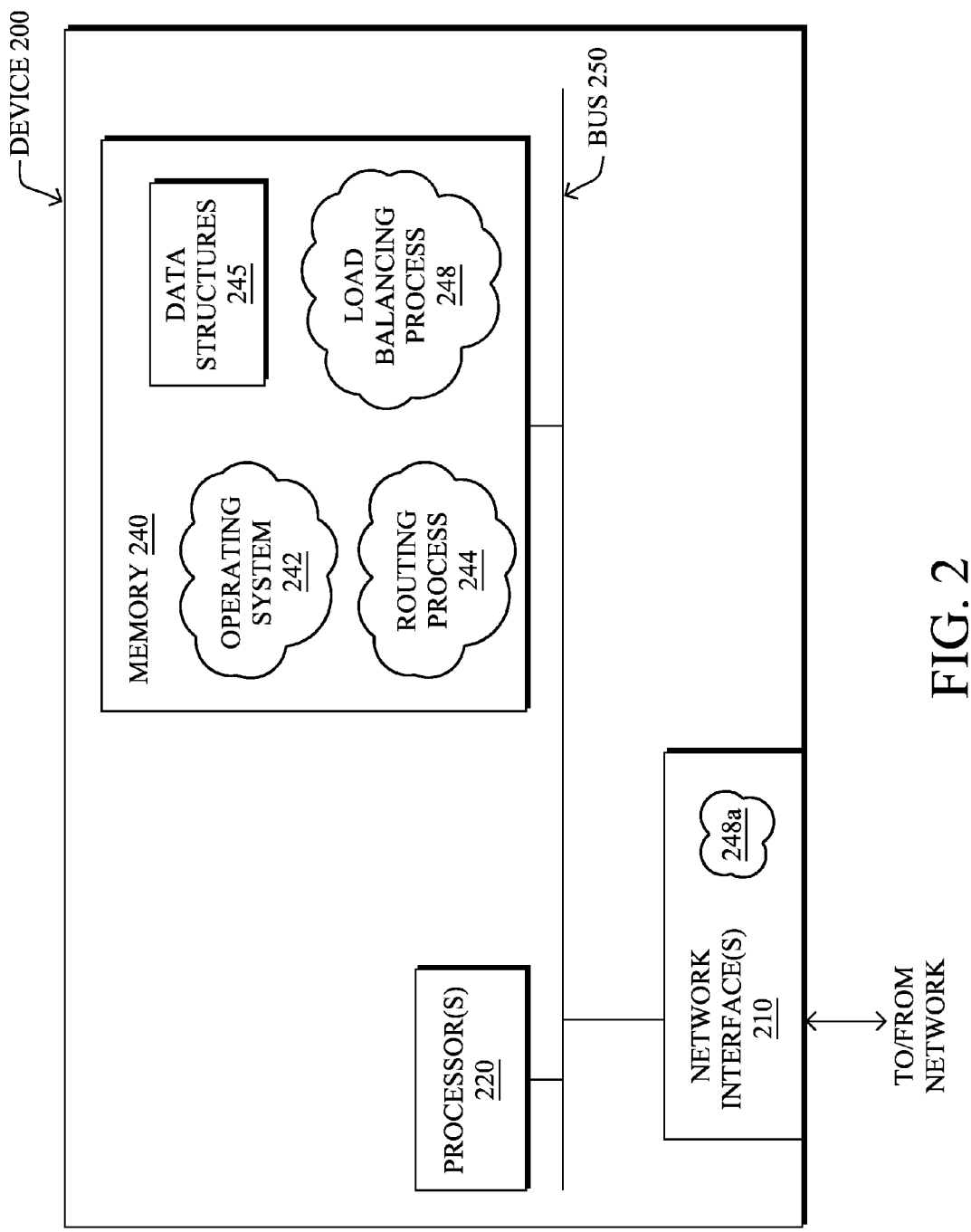
FIG. 2 illustrates an example network device/node.

FIG. 2 is a schematic block diagram of an example node/device 200 that may be used with one or more embodiments described herein, e.g., as any of the routers 110 (e.g., PEs) as shown in FIG. 1. The device comprises a plurality of network interfaces 210, one or more processors 220, and a memory 240 interconnected by a system bus 250. The network interfaces 210 contain the mechanical, electrical, and signaling circuitry for communicating data over physical links coupled to the network 100. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc. Notably, a physical network interface 210 may also be used to implement one or more virtual network interfaces, such as for Virtual Private Network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc.), portions of which are typically resident in memory 240 and executed by the processor(s), functionally organizes the node by, inter alia, invoking network operations in support of software processes and/or services executing on the device. These software processes and/or services may comprise routing services 244 and an illustrative load-balancing process 248, as described herein, which may alternatively be located within individual network interfaces (e.g., process 248a).

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Routing process/services 244 contain computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database (not shown) containing, e.g., data used to make forwarding decisions. In particular, changes in the network topology may be communicated among routers 200 using routing protocols, such as the conventional OSPF and IS-IS link-state protocols (e.g., to "converge" to an identical view of the network topology). Notably, routing services 244 may also perform functions related to virtual routing protocols, such as maintaining VRF instances (not shown), or tunneling protocols, such as for Multi-Protocol Label Switching (MPLS), generalized MPLS (GMPLS), etc., each as will be understood by those skilled in the art.

As noted above, Service Providers (SPs) are increasingly interested in providing Cloud services. To that end, SPs are looking for technologies, both intra- and inter-data center, that address their interconnect requirements in terms of scale, resiliency, multi-tenancy, and virtual machine (VM) mobility. SPs want to offer Cloud services using their existing IP infrastructure. As such, they are looking at data center interconnect solutions that integrate seamlessly with their MPLS/IP install base.

E-VPN, e.g., as described in the IETF Internet Draft entitled "BGP MPLS Based Ethernet VPN" <draft-ietf-12vpn-evpn>, introduces a solution for multipoint L2VPN services, with advanced multi-homing capabilities, using BGP for distributing customer/client MAC address reachability information over the core MPLS/IP network. Also, IEEE Standard 802.1ah defines an architecture for Ethernet Provider Backbone Bridging (PBB), where MAC tunneling is employed to improve service instance and MAC address scalability in Ethernet as well as VPLS networks.

Moreover, the IETF Internet Draft entitled "PBB-EVPN" <draft-ietf-12vpn-pbb-evpn> discusses how PBB can be combined with E-VPN in order to reduce the number of BGP MAC advertisement routes by aggregating Customer/Client MAC (C-MAC) addresses via Provider Backbone MAC address (B-MAC), provide client MAC address mobility using C-MAC aggregation and B-MAC sub-netting, confine the scope of C-MAC learning to only active flows, offer per site policies and avoid C-MAC address flushing on topology changes. In particular, (PBB)E-VPN accommodates interconnect of data centers running different technologies.

A key requirement for service providers is to maximize the bisectional bandwidth over the interconnect between the data center (DC) network and the WAN. When the DC network is multi-homed to the MPLS PEs (serving as the WAN edge nodes), it is required to support an all-active redundancy model with flow-based load-balancing. This requirement applies to both unicast as well as multicast traffic. In (PBB) E-VPN, multicast traffic is transported using point-to-multipoint (P2MP) label switched multicast (LSM) trees, to ensure optimal delivery. Alternatively, ingress replication over multipoint-to-point (MP2P) LSPs may be used (this is not as optimal as using LSM, but has the advantage of not requiring maintenance of multicast state on the MPLS core nodes).

Figure 3A:
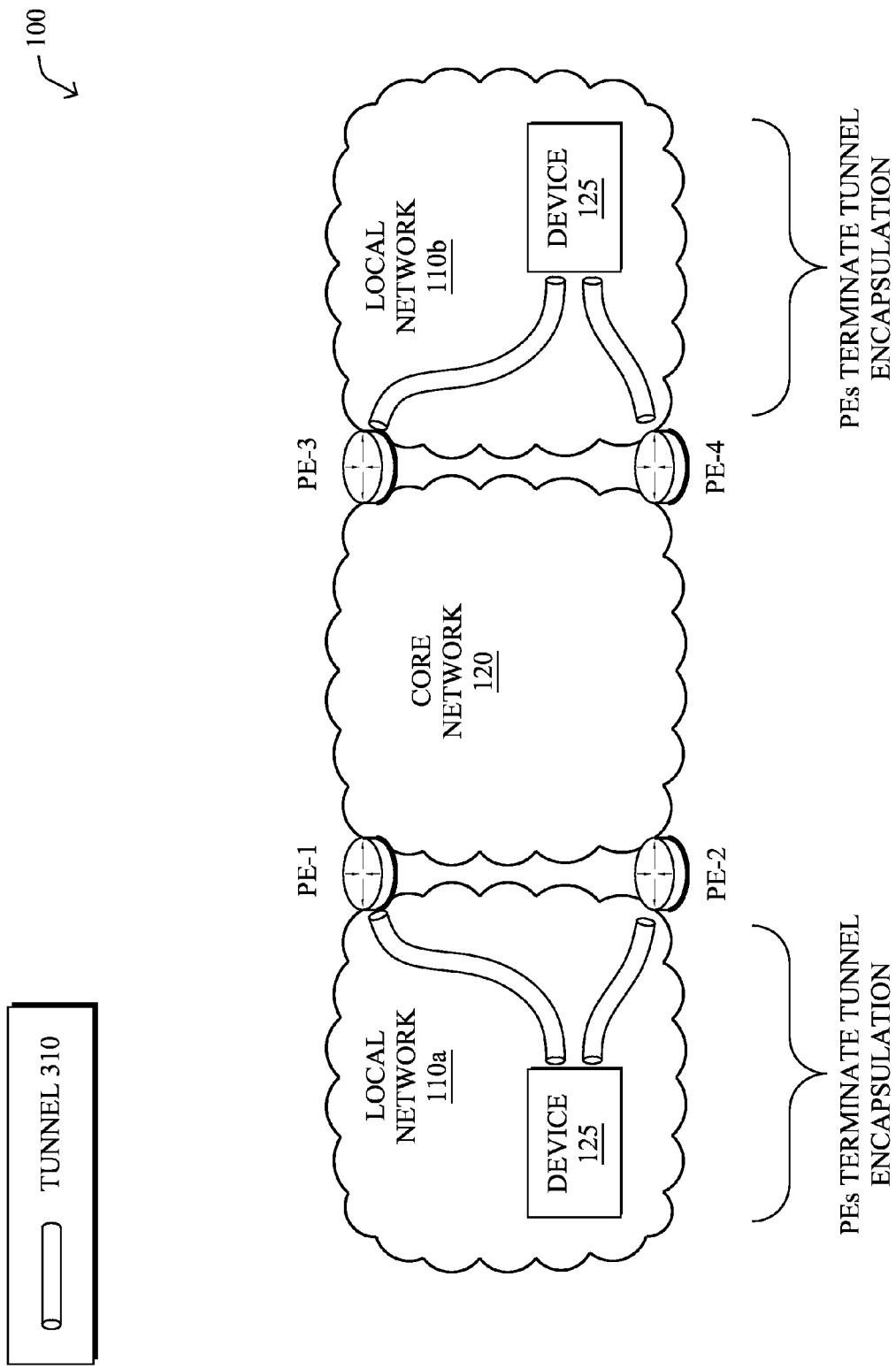
FIGS. 3A-3B illustrate examples of tunnel encapsulation termination in the computer network.
Figure 3B:
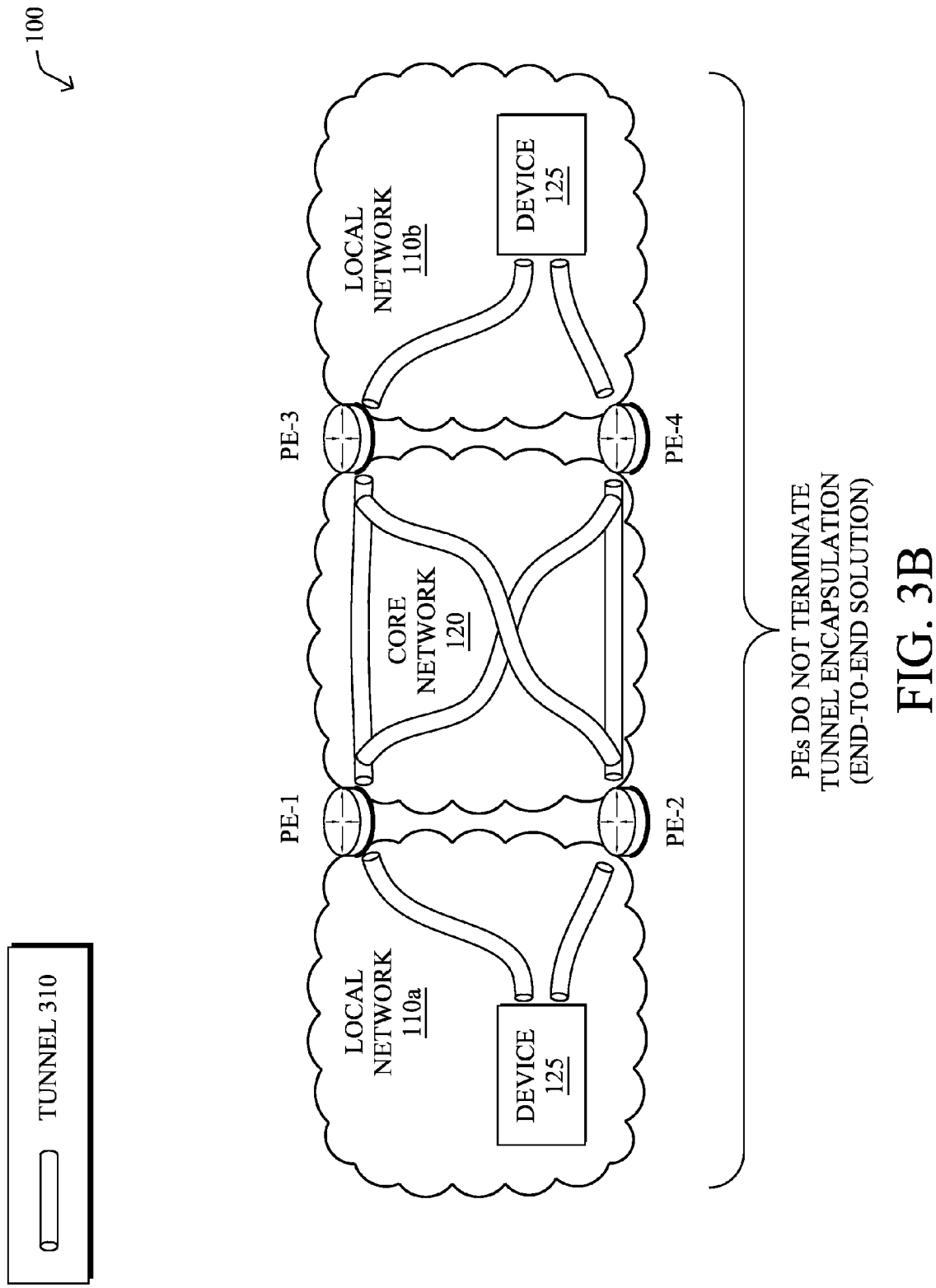

Referring again to FIG. 1, assume that local networks 110a,b are data centers (e.g., DC1 and DC2), and are embodied as either a Virtual Extensible Local Area Network (VXLAN) or a Network Virtualization using Generic Routing Encapsulation (NVGRE) network. In addition, the core network 120 may be an MPLS/IP network which provides interconnect between the local network and a remote network (i.e., the other local network) using Provider Backbone Bridging (PBB) Ethernet Virtual Private Network (E-VPN) forwarding. Notably, with reference to FIGS. 3A-3B, the VXLAN (or NVGRE) may either be terminated by the PEs (FIG. 3A) or it may be extended end-to-end (seamless hand-off scenario) (FIG. 3B). In general, P2MP LSM trees are used for multicast traffic delivery in the MPLS network 120, whereas Protocol Independent Multicast Sparse Mode (PIM-SM) (underlay) trees are used inside the DC networks 110.

Figure 4A:
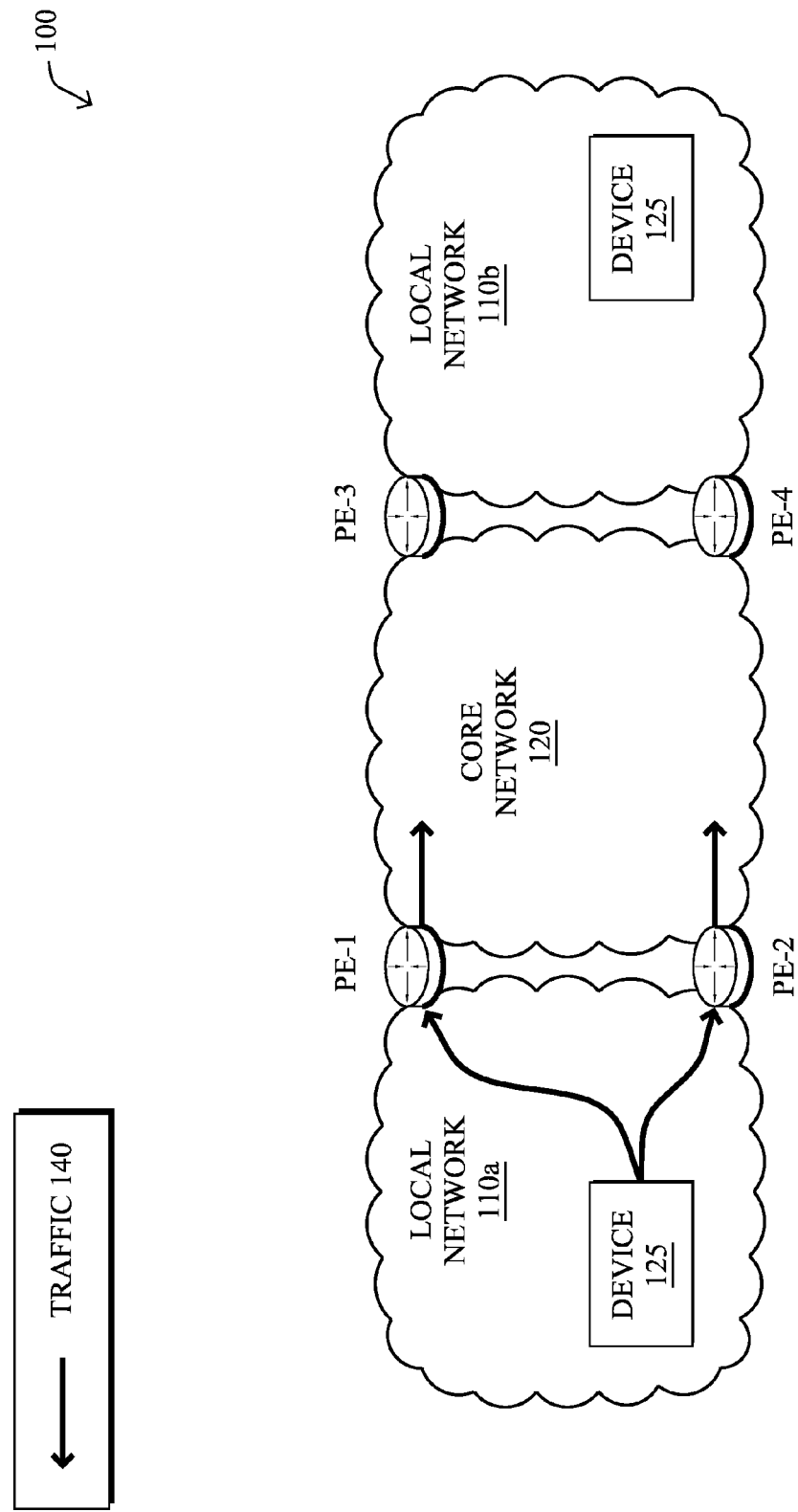
FIGS. 4A-4D illustrate examples of traffic handling.
Figure 4B:
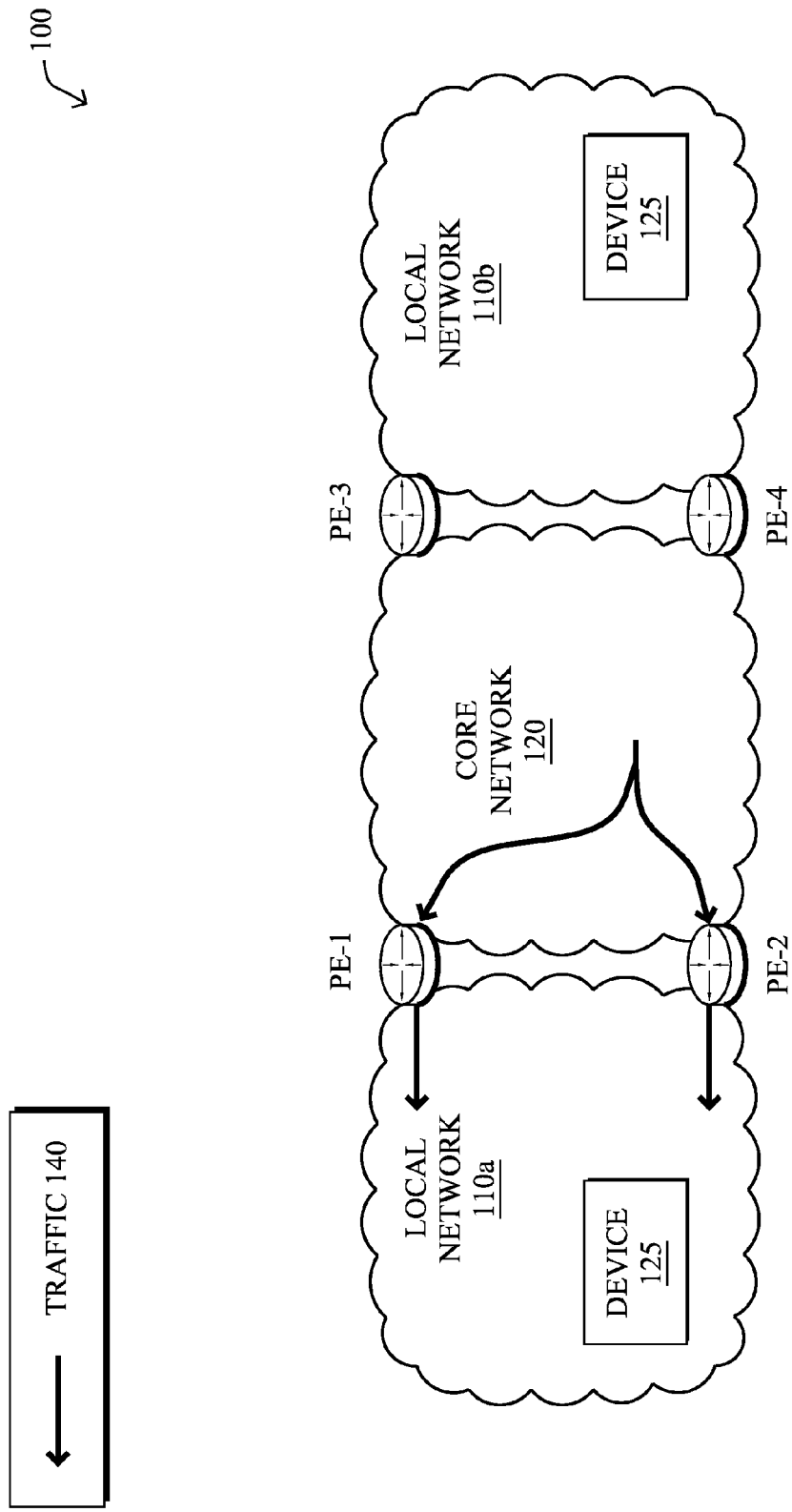
Figure 4C:
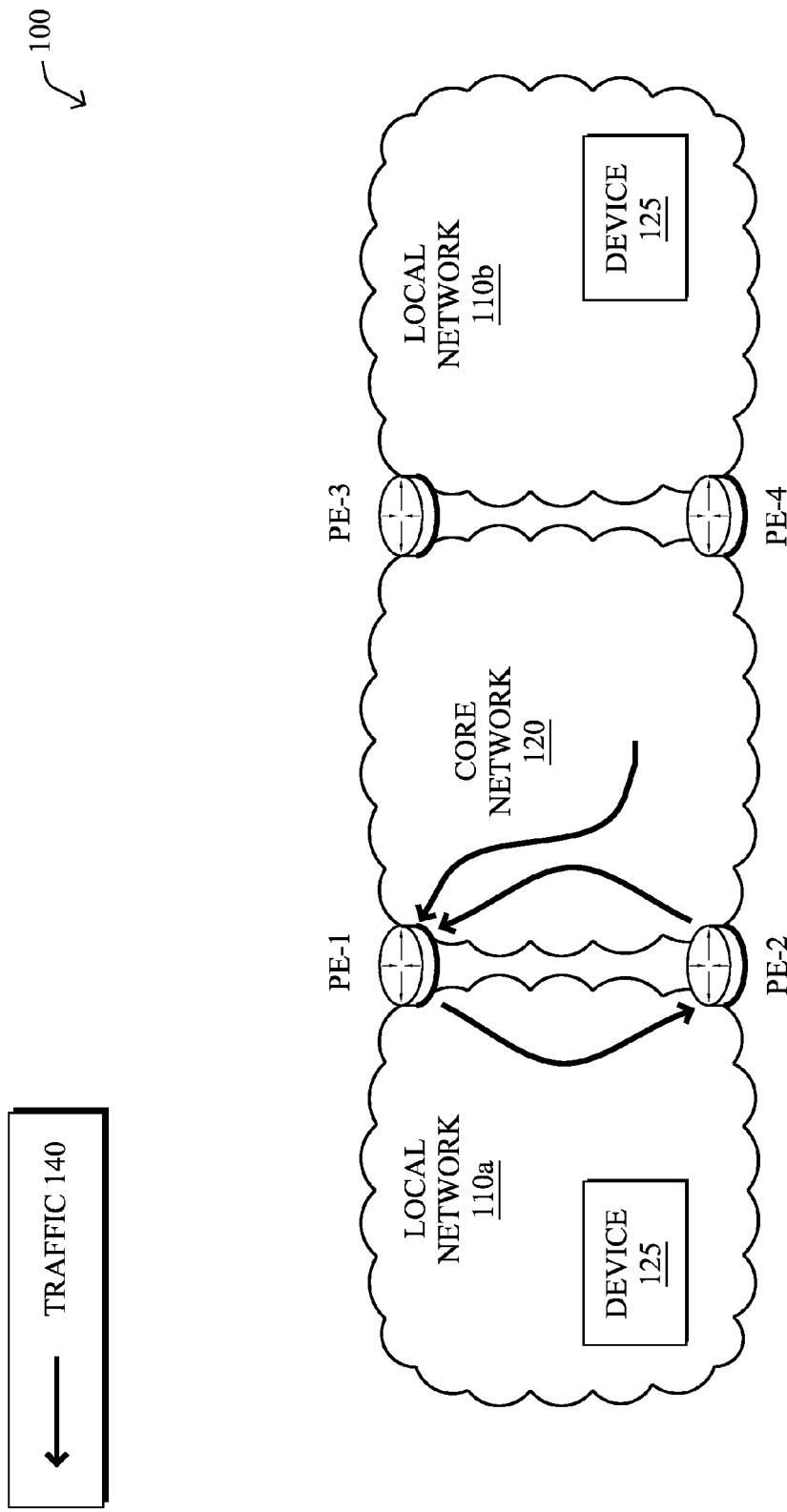

When the local (DC) networks 110 are multi-homed to the MPLS WAN (core network 120), then the five problems outlined below may arise when attempting to stitch the Underlay multicast trees to the LSM trees (with reference to FIGS. 4A-4D):

1—Packet duplication may occur for multicast traffic flooded from the DC to the WAN, if both PEs forward the same multicast stream (FIG. 4A).
2. Packet duplication may occur for multicast traffic flooded from the WAN to the DC, if both PEs forward the same multicast stream (FIG. 4B).
3—Forwarding loops may occur due to multicast traffic from the WAN being sent from one PE to another PE in the same DC site (e.g., multicast from WAN to PE1 to PE2 and then back to WAN) (FIG. 4C).

Figure 4D:
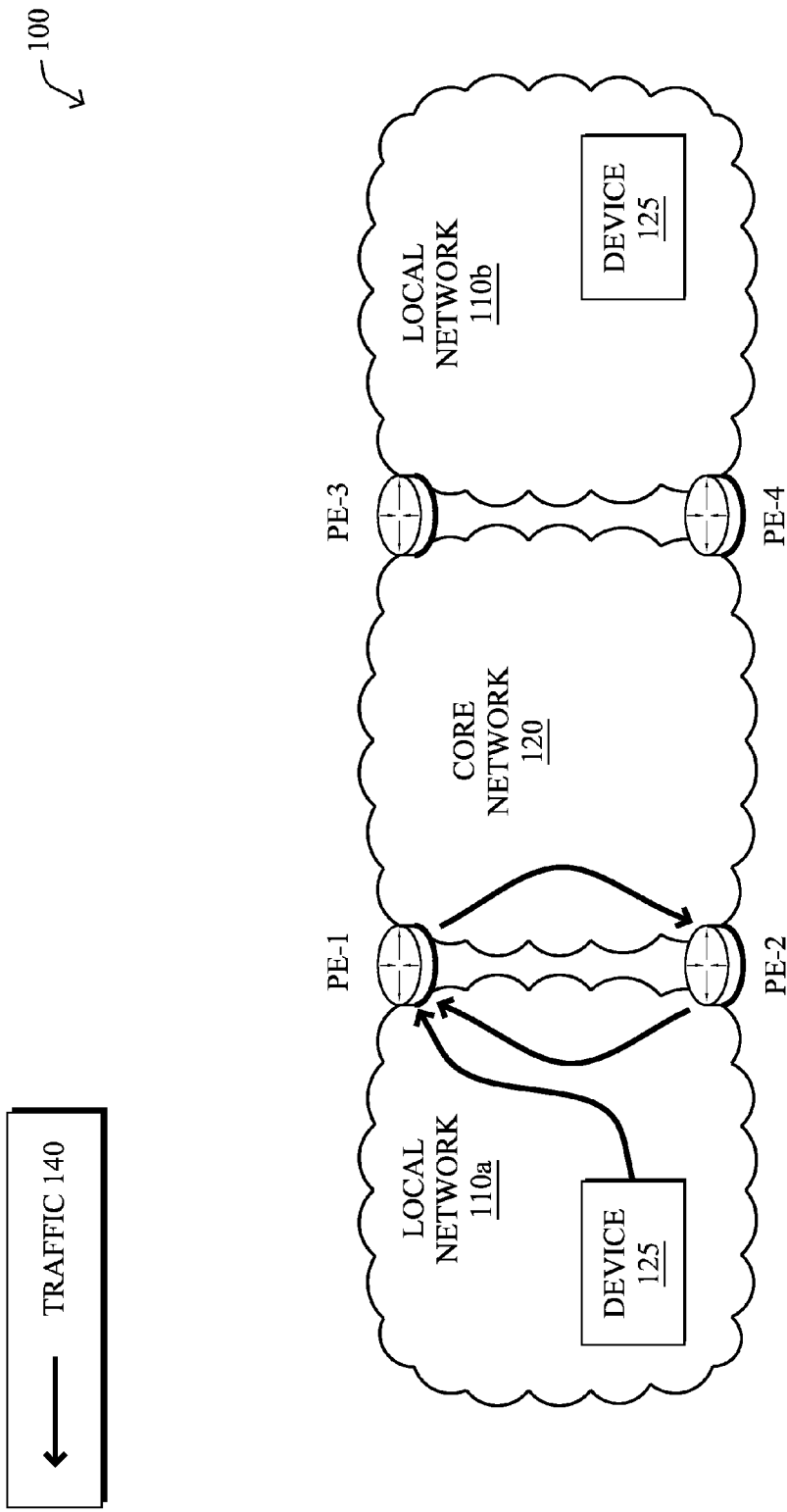

4—Forwarding loops may occur due to multicast traffic from the DC being sent from one PE to another PE over the WAN and into the same DC (e.g., multicast from DC1 to PE1 to PE2 and then back to DC1) (FIG. 4D).

5—Reverse-Path Forwarding (RPF) check failure for multicast traffic originating from the remote DC site: the IP routers local to a DC site need to perform the RPF checks on multicast traffic originating from remote DC sites based on the PE used to ingress into the local site.

The techniques herein stitch multicast trees to P2MP LSM trees with flow-based load-balancing. In particular, the techniques herein extend the (PBB)E-VPN control-plane and data-path in a manger described below depending on whether or not the PEs are terminating the VXLAN/NVGRE encapsulation. Specifically, according to one or more embodiments of the disclosure as described in detail below, a particular PE device of a plurality of multi-homing PE devices between a core network and a local network determines a subset of traffic for which the particular PE device is responsible. The particular PE also establishes, with itself as root, a multicast tree within the local network for one or more underlay multicast groups. Traffic received at the particular PE from the core network (e.g., from an LSM tree) is admitted into the local network only if the core (LSM tree) traffic corresponds to the subset of traffic for which the particular PE device is responsible, where the admitted traffic is mapped by the particular PE device into one of the one or more underlay multicast groups for which the particular PE device is the root. Also, multicast traffic received at the particular PE from the local network is forwarded into the core network only if the multicast traffic corresponds to the subset of traffic for which the particular PE device is responsible.

Illustratively, the techniques described herein may be performed by hardware, software, and/or firmware, such as in accordance with the load-balancing process 248/248a, which may contain computer executable instructions executed by the processor 220 (or independent processor of interfaces 210) to perform functions relating to the techniques described herein, e.g., in conjunction with routing process 244. For example, the techniques herein may be treated as extensions to conventional protocols, such as protocols typically operating on a PE in the environment described herein, and as such, may be processed by similar components understood in the art that execute those protocols, accordingly.

Figure 5A:
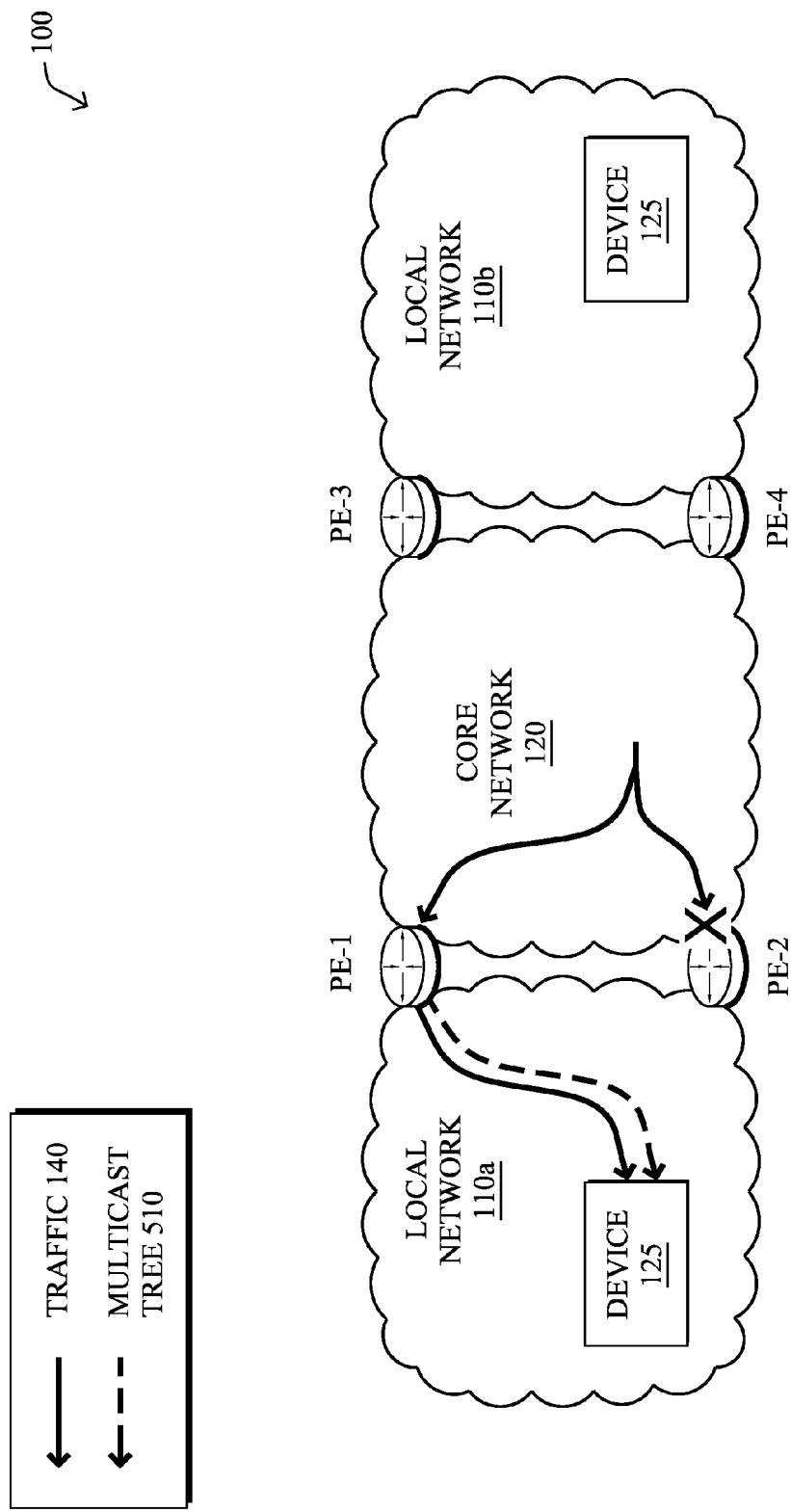
FIGS. 5A-5B illustrate examples of traffic handling in accordance with the techniques herein.
Figure 5B:
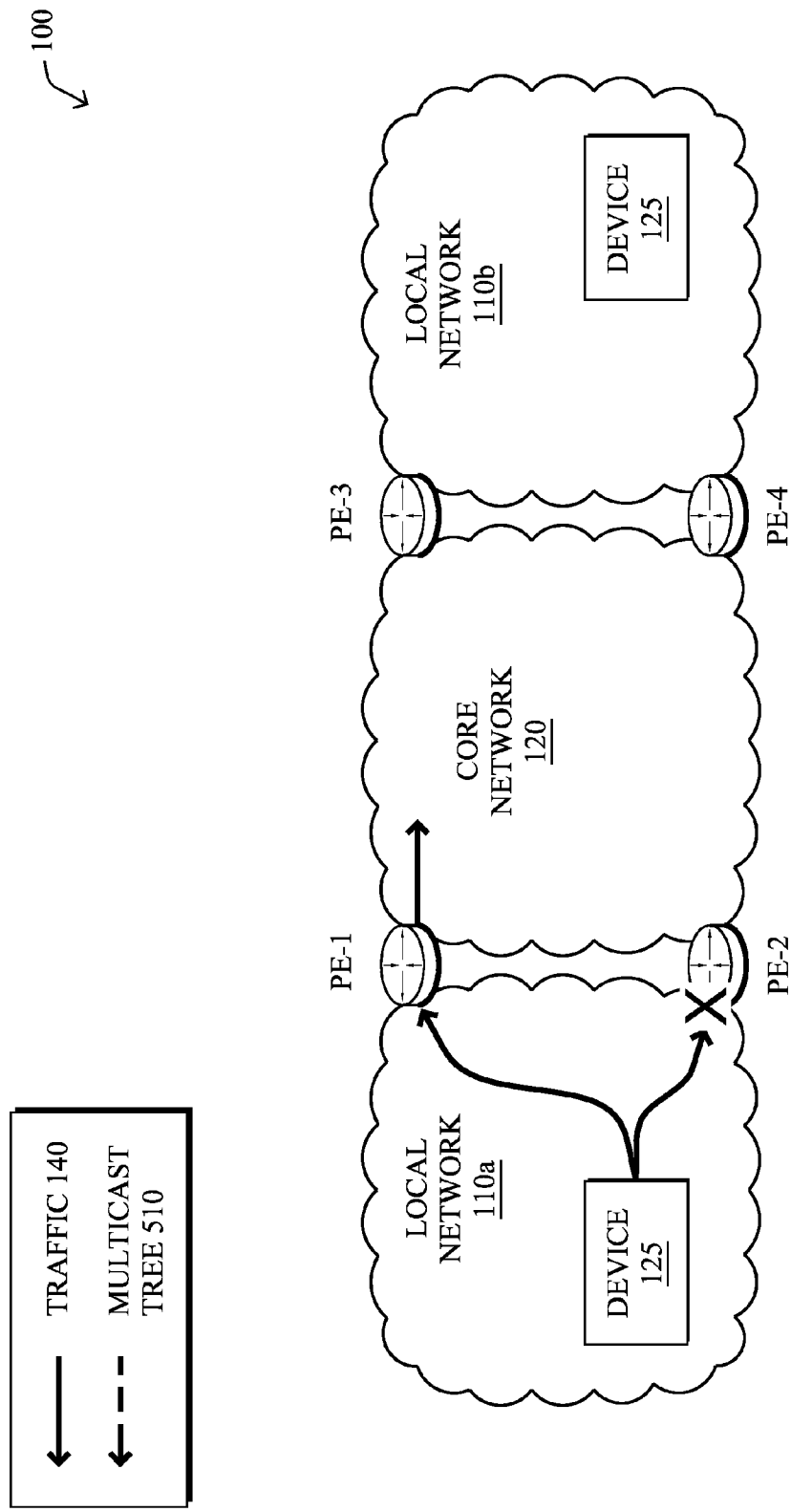

Operationally, assume two use cases, with general reference made to FIGS. 5A-5B. In case 1, the PEs terminate the tunnel (VXLAN/NVGRE) encapsulation. According to this first case, BGP designated forwarder (DF) election may be performed on the customer flow, e.g., an "N-Tuple" comprising the customer's L2/L3 addresses and L4 ports. This can be done by treating the N-Tuple as a numeric value, and performing a modulo hash function against the number of PEs in a particular Redundancy Group (e.g., between a particular local network and the core network) in order to identify the index of the PE that is the DF for a given N-Tuple. (This illustratively assumes that the PE IP addresses are ordered in a list, and an index is assigned to each.)

As shown in FIG. 5A, the PE sets up in the Data Center network a multicast (e.g., PIM-SM) tree 510 rooted at itself for one or more underlay multicast groups (S, G). In addition, the PE programs its data-path such that for traffic coming from the WAN over an LSM tree, it admits only frames whose N-Tuple corresponds to a value for which the PE in question is the DF. Notably, the PE maps those frames into one of the underlay multicast groups that it is the root for. This mapping can be per VNI (inclusive) or based on some mapping of the customer multicast groups to the underlay multicast group (selective). In addition, as shown in FIG. 5B, the PE programs its data-path such that for traffic from the Data Center network, any multicast received over a given tree is only forwarded by the PE that is the DF for the N-Tuple, thus preventing forwarding loops via the WAN. Note that other options for this case include performing the DF election per N-Tuple, where the N-Tuple could be: per service, per customer multicast group (S, G), per customer source, etc.

In case 2, PEs are not terminating the tunnel encapsulation, and the BGP DF election may be performed per virtual network interface (VNI). In particular, again with reference to FIG. 5A, the PE sets up in the Data Center network a multicast (PIM-SM) tree rooted at itself for one or more underlay multicast groups (S, G), and programs its data-path such that for traffic coming from the WAN over an LSM tree, it admits only frames whose VNI corresponds to a value for which the PE in question is the DF. The PE maps those frames into one of the underlay multicast groups that it is the root for by rewriting the source IP address of the VXLAN/NVGRE tunnel, and optionally the underlay's destination multicast group address. (Rewriting the source address may be required to pacify the RPF checks.) In addition, with reference again to FIG. 5B, the PE programs its data-path such that for traffic from the Data Center network, any multicast received over a given tree is only forwarded by the PE that is the DF for the VNI, again preventing forwarding loops via the WAN.

Figure 6:
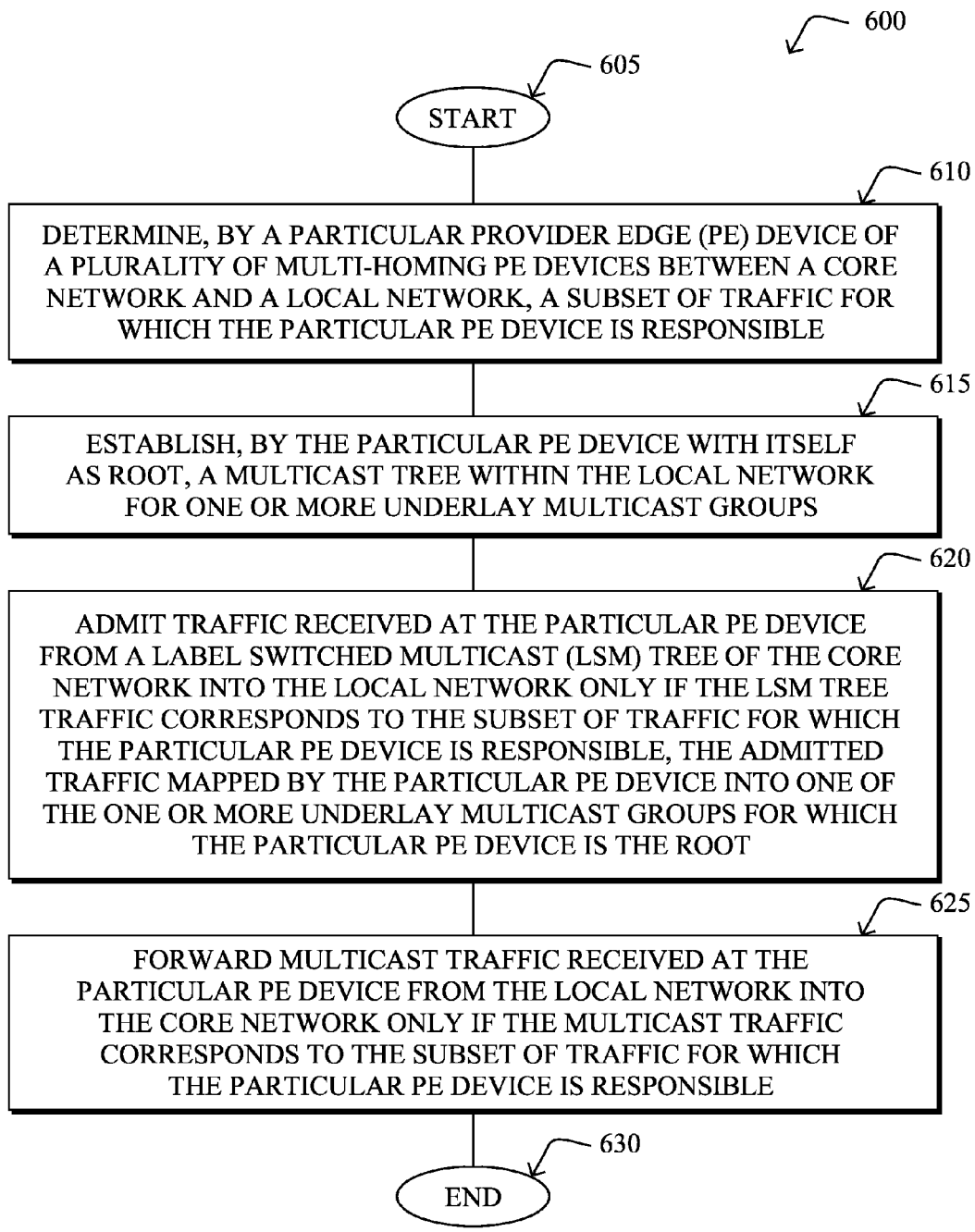
FIG. 6 illustrates an example simplified procedure for stitching multicast trees to P2MP LSM trees with flow-based load-balancing.

FIG. 6 illustrates an example simplified procedure 600 for stitching multicast trees to P2MP LSM trees with flow-based load-balancing in accordance with one or more embodiments described herein. The procedure 600 may start at step 605, and continues to step 610, where, as described in greater detail above, a particular PE device of a plurality of multi-homing PE devices between a core network and a local network determines a subset of traffic for which the particular PE device is responsible. For instance, as mentioned above, such a determination may be made by equating a traffic identification of traffic (e.g., an N-Tuple, a VNI, etc.) as a numeric value, and performing a modulo hash function against the number of the plurality of multi-homing PE devices to create and index referencing a given PE device for a corresponding subset of traffic, thus identifying the subset of traffic for which the particular PE device is responsible based on the index. Also, in step 615, the particular PE device, with itself as root, establishes a multicast (e.g., PIM-SM) tree within the local network for one or more underlay multicast groups.

In step 620, traffic received at the particular PE device from an LSM tree of the core network (or MP2P LSP) is admitted into the local network only if the core traffic (e.g., LSM tree traffic) corresponds to the subset of traffic for which the particular PE device is responsible, the admitted traffic mapped by the particular PE device into one of the one or more underlay multicast groups for which the particular PE device is the root. Also, in step 625, multicast traffic received at the particular PE device from the local network is forwarded into the core network only if the multicast traffic corresponds to the subset of traffic for which the particular PE device is responsible.

Notably, as mentioned above, the plurality of multi-homing PE devices may or may not terminate tunnel encapsulation from the local network. If terminating the tunnel encapsulation, then the subset of traffic for which the particular PE device is responsible is determined according to a basis such as: per customer flow; per service; per customer multicast group; and per customer source. Note that admitted traffic in step 620 may be mapped per VNI, or based on a mapping of one or more customer multicast groups to the one or more underlay multicast groups.

Conversely, if the PE devices do not terminate tunnel encapsulation from the local network, then as described above the subset of traffic for which the particular PE device is responsible is per VNI. Also, in this instance, the admitted traffic in step 620 may be mapped by rewriting a source IP address of the VXLAN/NVGRE tunnel to the source IP address of the particular PE device, and optionally by also rewriting a destination multicast group address with an address of the corresponding underlay multicast group, as described above.

The illustrative procedure 600 ends in step 630, notably with the ability to continue processing traffic at the PE devices accordingly. It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, stitch multicast trees to P2MP LSM trees with flow-based load-balancing in a computer network. In particular, the techniques herein provide flow-based load-balancing of multicast traffic over LSM trees for traffic from the server (DC network) to the core (MPLS/IP network), and for traffic from the core to the server. In general, the techniques herein require less multicast state in the MPLS core compared other techniques, and guarantees complete control-plane decoupling between DC sites being interconnected over the IP core. Furthermore, the ability to perform flow-based load-balancing on multicast traffic is paramount for bandwidth intensive applications (e.g., video), where per-VLAN load-balancing does not offer a sufficient level of granularity.

While there have been shown and described illustrative embodiments that stitch multicast trees to P2MP LSM trees with flow-based load-balancing, it is to be understood that various other adaptations and modifications may be made within the spirit and scope of the embodiments herein. For example, the embodiments have been shown and described herein with relation to particular types of networks and associated protocols and terminology. However, the embodiments in their broader sense are not as limited, and may, in fact, be used with other types of networks and/or protocols, where suitable. Also, while LSM trees are generally shown and described, the techniques may also be used with MP2P LSPs, as noted above.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    determining, by a particular provider edge (PE) device of a plurality of multi-homing PE devices between a core network and a local network, a subset of traffic for which the particular PE device is responsible;
    establishing, by the particular PE device with itself as root, a multicast tree within the local network for one or more underlay multicast groups;
    admitting traffic received at the particular PE device from the core network into the local network only if the core traffic corresponds to the subset of traffic for which the particular PE device is responsible, the admitted traffic mapped by the particular PE device into one of the one or more underlay multicast groups for which the particular PE device is the root; and
    forwarding multicast traffic received at the particular PE device from the local network into the core network only if the multicast traffic corresponds to the subset of traffic for which the particular PE device is responsible,
    wherein the core traffic received at the particular PE device from the core network into the local network is received at the particular PE from a label switched multicast (LSM) tree.

2. The method as in claim 1, wherein the local network is one of either a Virtual Extensible Local Area Network (VXLAN) or a Network Virtualization using Generic Routing Encapsulation (NVGRE) network.

3. The method as in claim 1, wherein the core network is a Multi-Protocol Label Switching (MPLS)/Internet Protocol (IP) network.

4. The method as in claim 3, wherein the MPLS/IP network provides interconnect between the local network and a remote network using one of either Ethernet Virtual Private Network (E-VPN) forwarding or Provider Backbone Bridging (PBB) E-VPN forwarding.

5. The method as in claim 1, wherein determining the subset of traffic for which the particular PE device is responsible comprises:
    equating a traffic identification of traffic as a numeric value;
    performing a modulo hash function against the number of the plurality of multi-homing PE devices to create and index referencing a given PE device for a corresponding subset of traffic; and
    identifying the subset of traffic for which the particular PE device is responsible based on the index.

6. The method as in claim 1, wherein the plurality of multi-homing PE devices terminate tunnel encapsulation from the local network.

7. The method as in claim 6, wherein the subset of traffic for which the particular PE is responsible is determined according to a basis selected from a group consisting of: per customer flow; per service; per customer multicast group; and per customer source.

8. The method as in claim 6, wherein the admitted traffic is mapped per virtual network interface (VNI).

9. The method as in claim 6, wherein the admitted traffic is mapped based on a mapping of one or more customer selected multicast groups to the one or more underlay multicast groups.

10. The method as in claim 1, wherein the plurality of multi-homing PE devices do not terminate tunnel encapsulation from the local network.

11. The method as in claim 10, wherein the subset of traffic for which the particular PE device is responsible is per virtual network interface (VNI).

12. The method as in claim 10, wherein the admitted traffic is mapped by rewriting a source Internet Protocol (IP) address of an encapsulation tunnel to the source IP address of the particular PE device.

13. The method as in claim 12, wherein the admitted traffic is mapped by also rewriting a destination multicast group address with an address of the corresponding underlay multicast group.

14. The method as in claim 1, wherein the established multicast tree is a Protocol Independent Multicast Sparse Mode (PIM-SM) tree.

15. An apparatus, comprising:
one or more network interfaces to communicate as a particular provider edge (PE) device of a plurality of multi-homing PE devices between a core network and a local network;
a processor coupled to the network interfaces and adapted to execute one or more processes; and
a memory configured to store a process executable by the processor, the process when executed operable to:
determine a subset of traffic for which the particular PE device is responsible;
establish, with the particular PE device as root, a multicast tree within the local network for one or more underlay multicast groups;
admit traffic received at the particular PE device from the core network into the local network only if the core traffic corresponds to the subset of traffic for which the particular PE device is responsible, the admitted traffic mapped by the particular PE device into one of the one or more underlay multicast groups for which the particular PE device is the root; and
forward multicast traffic received at the particular PE device from the local network into the core network only if the multicast traffic corresponds to the subset of traffic for which the particular PE device is responsible,
wherein the core traffic received at the particular PE device from the core network into the local network is received at the particular PE from a label switched multicast (LSM) tree.

16. The apparatus as in claim 15, wherein the local network is one of either a Virtual Extensible Local Area Network (VXLAN) or a Network Virtualization using Generic Routing Encapsulation (NVGRE) network.

17. The apparatus as in claim 15, wherein the core network is a Multi-Protocol Label Switching (MPLS)/Internet Protocol (IP) network, and wherein the MPLS/IP network provides interconnect between the local network and a remote network using one of either Ethernet Virtual Private Network (E-VPN) forwarding or Provider Backbone Bridging (PBB) E-VPN forwarding.

18. The apparatus as in claim 15, wherein the plurality of multi-homing PE devices terminate tunnel encapsulation from the local network.

19. The apparatus as in claim 18, wherein the subset of traffic for which the particular PE is responsible is determined according to a basis selected from a group consisting of: per customer flow; per service; per customer multicast group; and per customer source.

20. The apparatus as in claim 15, wherein the plurality of multi-homing PE devices do not terminate tunnel encapsulation from the local network.

21. The apparatus as in claim 20, wherein the subset of traffic for which the particular PE is responsible is per virtual network interface (VNI).

22. A tangible, non-transitory, computer-readable media having software encoded thereon, the software, when executed by a processor on a particular provider edge (PE) device of a plurality of multi-homing PE devices between a core network and a local network, operable to:
determine a subset of traffic for which the particular PE device is responsible;
establish, with the particular PE device as root, a multicast tree within the local network for one or more underlay multicast groups;
admit traffic received at the particular PE device from the core network into the local network only if the core traffic corresponds to the subset of traffic for which the particular PE device is responsible, the admitted traffic mapped by the particular PE device into one of the one or more underlay multicast groups for which the particular PE device is the root; and
forward multicast traffic received at the particular PE device from the local network into the core network only if the multicast traffic corresponds to the subset of traffic for which the particular PE device is responsible,
wherein the core traffic received at the particular PE device from the core network into the local network is received at the particular PE from a label switched multicast (LSM) tree.

* * * * *